(12) United States Patent
Ikitake et al.

(10) Patent No.: US 11,522,486 B2
(45) Date of Patent: Dec. 6, 2022

(54) TEMPERATURE ESTIMATION DEVICE, MOTOR CONTROL DEVICE, AND TEMPERATURE ESTIMATION METHOD

(71) Applicant: Mitsubishi Electric Corporation, Tokyo (JP)

(72) Inventors: Yoshitaka Ikitake, Tokyo (JP); Ryoichi Ishihara, Tokyo (JP); Yuki Minakuchi, Tokyo (JP); Tomohiro Okumura, Tokyo (JP); Daishi Iwasa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 109 days.

(21) Appl. No.: 17/281,060

(22) PCT Filed: Nov. 13, 2018

(86) PCT No.: PCT/JP2018/041996
§ 371 (c)(1),
(2) Date: Mar. 29, 2021

(87) PCT Pub. No.: WO2020/100218
PCT Pub. Date: May 22, 2020

(65) Prior Publication Data
US 2021/0336576 A1    Oct. 28, 2021

(51) Int. Cl.
*H02P 27/08* (2006.01)
*H02P 29/64* (2016.01)

(52) U.S. Cl.
CPC ............ *H02P 27/085* (2013.01); *H02P 29/64* (2016.02)

(58) Field of Classification Search
CPC ......... H02P 27/085; H02P 29/64; H02P 27/08
USPC ......................................... 318/473, 471, 445
See application file for complete search history.

(56) References Cited

U.S. PATENT DOCUMENTS 7,817,384 B2 * 10/2010 Woods .................. B24B 23/028
                                                                 318/434
2017/0184014 A1    6/2017 Ueno et al.

FOREIGN PATENT DOCUMENTS

JP          8-133107 A      5/1996
JP          2017-115813 A   6/2017

* cited by examiner

*Primary Examiner* — David Luo
(74) *Attorney, Agent, or Firm* — Birch, Stewart, Kolasch & Birch, LLP

(57) ABSTRACT

A temperature estimation device estimates a drive duty ratio by taking account of the influence of ambient temperature on the energization to a coil part, on the basis of a drive duty ratio and the ambient temperature, and estimates the power consumption of a motor when the coil part is energized with the estimated drive duty ratio, the power consumption of the motor, this power consumption being accompanied by the heat dissipation of the coil part, the power difference between both the power consumption values, the temperature time constant of the coil part, and a temperature variation during a period of the temperature time constant of the coil part, and estimates the temperature variation of the coil part from the ambient temperature on the basis of these estimated values and a last temperature variation of the coil part.

5 Claims, 5 Drawing Sheets

TEMPERATURE ESTIMATION DEVICE, MOTOR CONTROL DEVICE, AND TEMPERATURE ESTIMATION METHOD

TECHNICAL FIELD

The present disclosure relates to a temperature estimation device for, a motor control device for, and a temperature estimation method of estimating the temperature of a coil part (hereinafter referred to as "coil temperature") which constitutes a motor.

BACKGROUND ART

When a voltage is applied to a direct-current motor, heat is generated by the resistance of a coil thereof and it raises the temperature of the coil. Because there is a possibility that when the coil temperature rises excessively, the coating of the coil suffers a dielectric breakdown, it is necessary to limit the application of the voltage to the motor before the coil temperature exceeds an allowable upper limit temperature.

For example, Patent Literature 1 discloses a device that estimates the temperature of a motor on the basis of both a voltage between the terminals of the motor and a motor current. In this device, a limit is imposed on the maximum value of the current to be supplied to the motor, in accordance with the average or the integral of the value obtained by multiplying the voltage between the terminals of the motor by the motor current. The motor current is detected by a current sensor disposed for temperature estimation.

CITATION LIST

Patent Literature

Patent Literature 1: JP H08-133107 A

SUMMARY OF INVENTION

Technical Problem

A problem with the conventional technique described in Patent Literature 1 is that a current sensor for detecting the motor current is needed.

The present disclosure is made to solve the above-mentioned problem, and it is therefore an object of the present disclosure to provide a temperature estimation device, a motor control device, and a temperature estimation method capable of estimating the coil temperature of a motor without using a current sensor.

Solution to Problem

A temperature estimation device according to the present disclosure includes A temperature estimation device according to the present disclosure includes processing circuitry to estimate a drive duty ratio by taking account of influence of ambient temperature of a motor on energization to a coil part which constitutes the motor, on a basis of both a drive duty ratio corresponding to time intervals of the energization to the coil part and the ambient temperature; to estimate power consumption of the motor that is in a state where the coil part is being energized with the drive duty ratio, on a basis of a supply voltage applied to the motor and the drive duty ratio; to estimate power consumption of the motor that is in a state where the coil part is being energized with the drive duty ratio, this power consumption being accompanied by heat dissipation of the coil part, on a basis of the drive duty ratio, the supply voltage applied to the motor, and a temperature variation of the coil part, this temperature variation being estimated last time; to estimate a temperature variation during a period of a temperature time constant of the coil part on a basis of the power consumption of the motor; to estimate the temperature time constant of the coil part on a basis of a power difference between the power consumption of the motor and the power consumption; and to estimate a temperature variation of the coil part from the ambient temperature on a basis of the temperature variation of the coil part, the temperature time constant, the power difference, and the temperature variation of the coil part estimated the last time.

Advantageous Effects of Invention

According to the present disclosure, the drive duty ratio is estimated, by taking account of the influence of ambient temperature of a motor on the energization to the coil part which constitutes the motor, on the basis of both the drive duty ratio corresponding to the time intervals of the energization to the coil part and the ambient temperature, the power consumption of the motor when the coil part is energized with the estimated drive duty ratio, the power consumption of the motor accompanied by the heat dissipation of the coil part, the power difference between both the power consumption values, the temperature time constant of the coil part, and the temperature variation during a period of the temperature time constant of the coil part are estimated, and the temperature variation of the coil part from the ambient temperature is estimated on the basis of these estimated values and the temperature variation of the coil part estimated the last time. As a result, the coil temperature of the motor can be estimated without using a current sensor.

DESCRIPTION OF EMBODIMENTS

Embodiment 1

Figure 1:
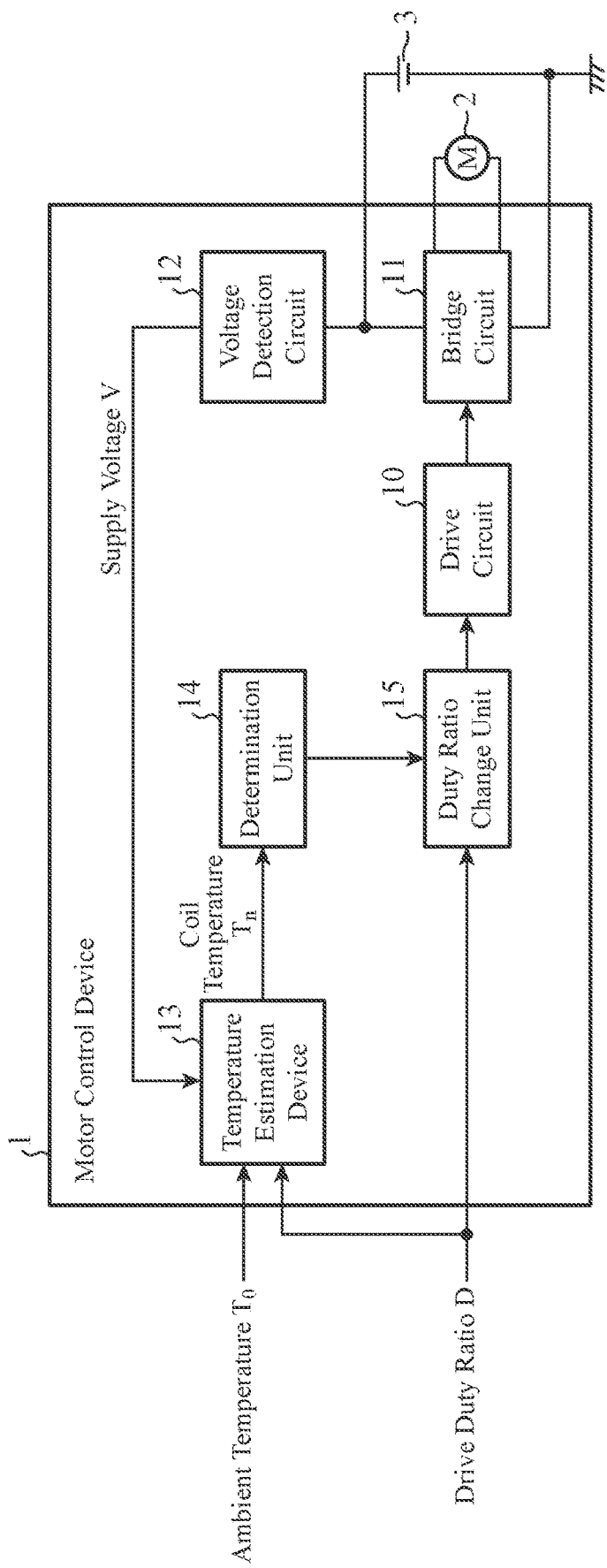
FIG. 1 is a block diagram showing the configuration of a motor control device according to Embodiment 1.

FIG. 1 is a block diagram showing the configuration of a motor control device 1 according to Embodiment 1. The motor control device 1 controls the operation of a motor 2, and the motor 2 operates with a supply voltage V from a direct current power supply 3. For example, the motor 2 drives an actuator mounted in a vehicle. The actuator drives various types of valves mounted in the vehicle. As shown in FIG. 1, the motor control device 1 includes a drive circuit 10, a bridge circuit 11, a voltage detection circuit 12, a temperature estimation device 13, a determination unit 14, and a duty ratio change unit 15.

The drive circuit 10 performs pulse width modulation (hereinafter referred to as "PWM") control on energization to the motor 2 in accordance with a drive duty ratio D inputted from the duty ratio change unit 15. The drive duty ratio D corresponds to the time intervals of the energization to a coil part which constitutes the motor 2. The bridge circuit 11 is a bridge circuit constituted by field effect transistors (hereinafter referred to as "FETs") and configured to chop a voltage from the direct current power supply 3 in accordance with a PWM signal inputted from the drive circuit 10 and to apply the chopped voltage to the motor 2. The voltage detection circuit 12 detects the supply voltage V applied from the direct current power supply 3, via the bridge circuit 11 constituted by the FETs, to the motor 2.

The temperature estimation device 13 estimates a temperature variation $\Delta T_n$ of the coil part which constitutes the motor 2 from ambient temperature $T_0$ on the basis of the ambient temperature $T_0$, a command value of the drive duty ratio D, the supply voltage V, and a temperature variation $\Delta T_{n-1}$ which is estimated the last time as to the coil part, and calculates a current coil temperature $T_n$ using the ambient temperature $T_0$. For example, a temperature sensor for detecting the temperature of the cooling water for the engine is disposed in the vehicle in advance. Accordingly, using the temperature of the cooling water for the engine as the ambient temperature $T_0$, the temperature estimation device 13 can acquire the ambient temperature $T_0$ from the temperature sensor mounted in the vehicle, and a temperature sensor intended for detecting the ambient temperature $T_0$ becomes unnecessary.

The determination unit 14 determines whether or not the coil temperature $T_n$ estimated by the temperature estimation device 13 is normal. For example, when the coil temperature $T_n$ is equal to or greater than a reference value for determination of whether or not the coil temperature is abnormal, the determination unit 14 determines that the coil temperature $T_n$ has risen unusually and is not normal, whereas when the coil temperature $T_n$ is less than the reference value for determination of whether or not the coil temperature is abnormal, the determination unit 14 determines that the coil temperature $T_n$ is normal.

The duty ratio change unit 15 changes the drive duty ratio used for the PWM control by the drive circuit 10 on the basis of a result of the determination of the coil temperature $T_n$ by the determination unit 14. For example, when the determination unit 14 determines that the coil temperature $T_n$ is not normal, the duty ratio change unit 15 changes the drive duty ratio D shown by the command value to a lower value and outputs the drive duty ratio to the drive circuit 10. In contrast, when the determination unit 14 determines that the coil temperature $T_n$ is normal, the duty ratio change unit 15 outputs the drive duty ratio D shown by the command value to the drive circuit 10, just as it is.

Figure 2:
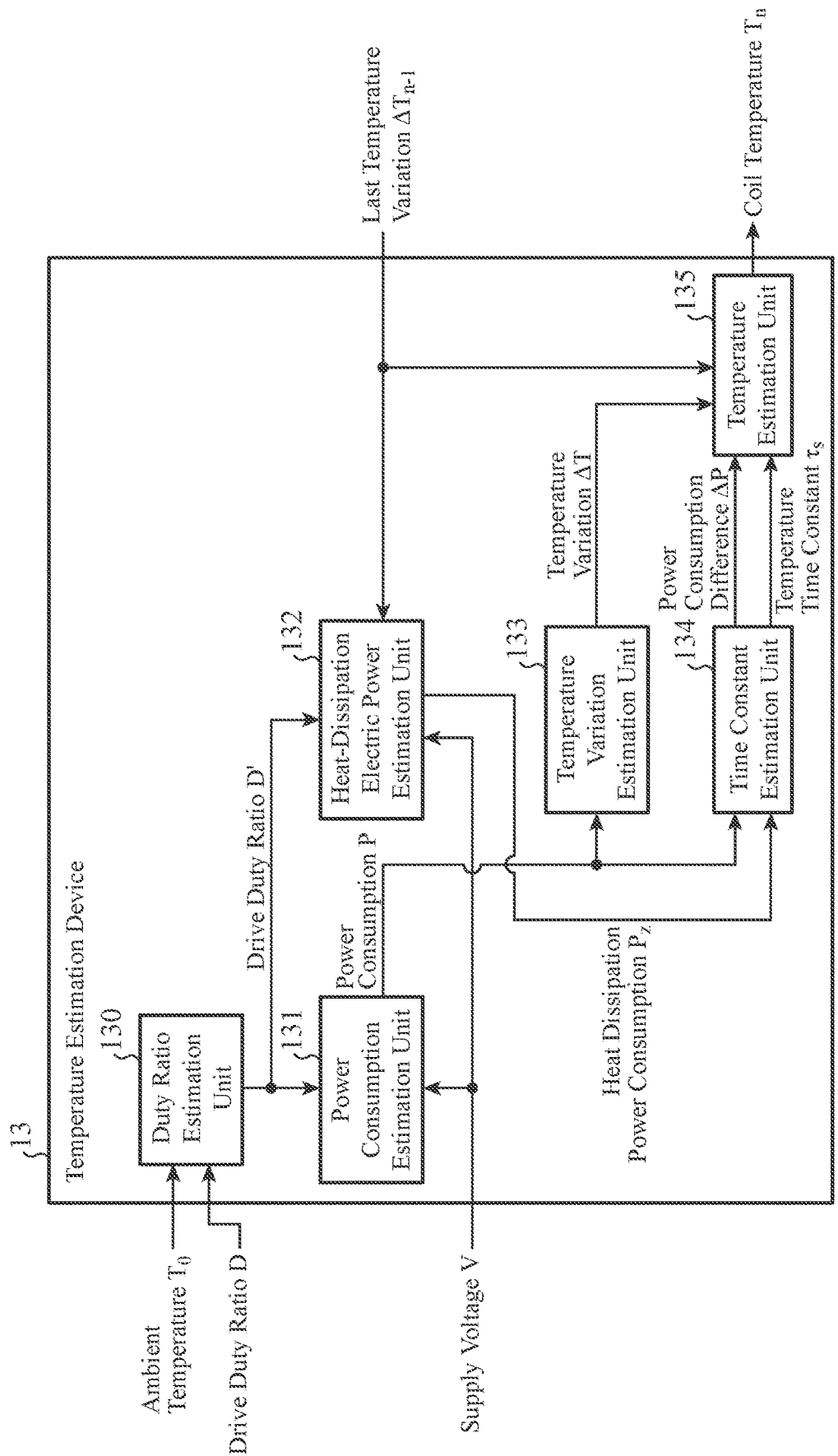
FIG. 2 is a block diagram showing the configuration of a temperature estimation device according to Embodiment 1.

FIG. 2 is a block diagram showing an example of the configuration of the temperature estimation device 13 according to Embodiment 1. As shown in FIG. 2, the temperature estimation device 13 includes a duty ratio estimation unit 130, a power consumption estimation unit 131, a heat-dissipation electric power estimation unit 132, a temperature variation estimation unit 133, a time constant estimation unit 134, and a temperature estimation unit 135. The duty ratio estimation unit 130 estimates a drive duty ratio D' by taking account of the influence of the ambient temperature $T_0$ of the motor 2 on the energization to the coil part, on the basis of the drive duty ratio D and the ambient temperature $T_0$.

The power consumption estimation unit 131 estimates the power consumption P of the motor 2 in which the coil part is energized with the drive duty ratio D' estimated by the duty ratio estimation unit 130, on the basis of the supply voltage V applied to the motor 2 and the drive duty ratio D'. The heat-dissipation electric power estimation unit 132 estimates the power consumption Pz of the motor 2, this power consumption being accompanied by the heat dissipation of the coil part energized with the drive duty ratio D' estimated by the duty ratio estimation unit 130, on the basis of the drive duty ratio D', the supply voltage V applied to the motor 2, and the temperature variation $\Delta T_{n-1}$ of the coil part estimated the last time.

The temperature variation estimation unit 133 estimates the temperature variation $\Delta T$ during a period of the temperature time constant τs of the coil part on the basis of the power consumption P of the motor 2 estimated by the power consumption estimation unit 131. The time constant estimation unit 134 estimates the temperature time constant τs of the coil part on the basis of the power difference $\Delta P$ (=P−Pz) between the power consumption P estimated by the power consumption estimation unit 131 and the power consumption Pz estimated by the heat-dissipation electric power estimation unit 132.

The temperature estimation unit 135 estimates the temperature variation $\Delta T_n$ of the coil part from the ambient temperature $T_0$ on the basis of the temperature variation $\Delta T$ during the period of the temperature time constant τs of the coil part, the temperature time constant τs estimated on the basis of the power difference $\Delta P$, the power difference $\Delta P$, and the temperature variation $\Delta T_{n-1}$ of the coil part estimated the last time. The temperature variation $\Delta T_n$ estimated by the temperature estimation unit 135 is stored in a memory not shown in FIG. 2. The heat-dissipation electric power estimation unit 132 and the temperature estimation unit 135 read the temperature variation $\Delta T_{n-1}$ estimated the last time from this memory. Further, the temperature estimation unit 135 calculates the coil temperature $T_n$ by adding the temperature variation $\Delta T_n$ to the ambient temperature $T_0$, and outputs the calculated coil temperature $T_n$ to the determination unit 14 included in the motor control device 1.

Figure 3:
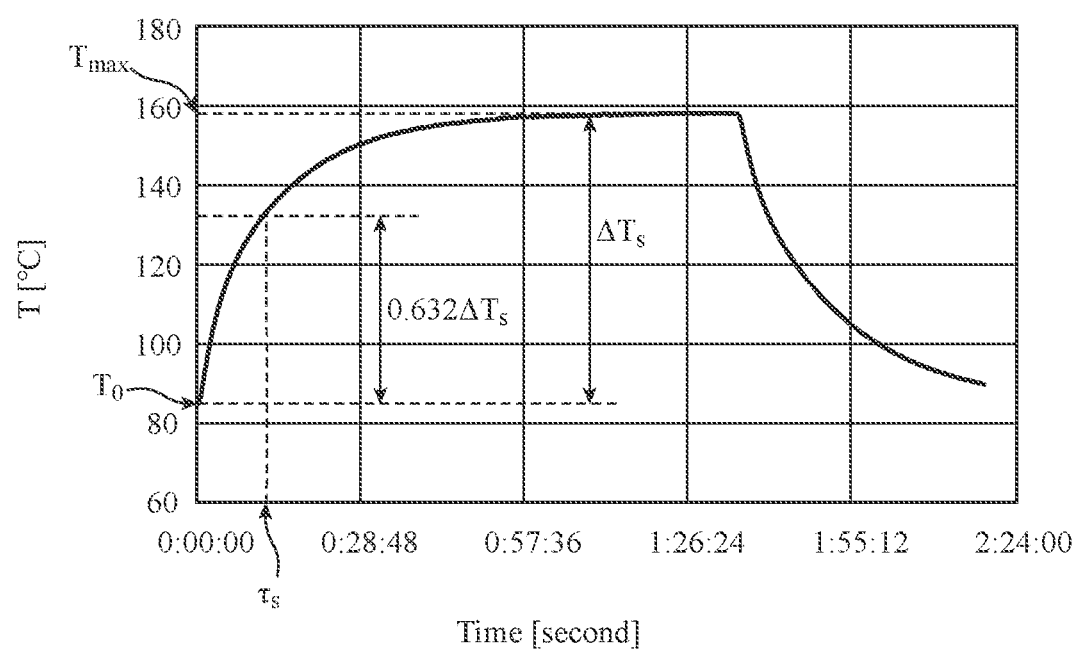
FIG. 3 is a graph showing the temperature characteristics of a coil part which constitutes a motor.

FIG. 3 is a graph showing the temperature characteristics of the coil part which constitutes the motor 2. When the coil part is energized, the coil part generates heat because of the coil resistance. At this time, the coil temperature varies with the energizing time of the coil part, as shown in FIG. 3. Typically, the coil temperature T(t) after a lapse of time t and the temperature variation $\Delta T(t)$ of the coil part during a period of time t can be expressed by the following equations (1) and (2). $T_0$ is the ambient temperature of the motor 2, τS is the temperature time constant of the coil part, and ATs is the temperature variation between the saturation temperature and the ambient temperature at the time of a rise of the coil temperature.

$$T(t)=T_0+\Delta T(t) \quad (1)$$

$$\Delta T(t)=\Delta Ts(1-e^{-t/\tau s}) \quad (2)$$

Although the temperature time constant τS is the time which elapses until the coil temperature reaches from the ambient temperature $T_0$ to a value which is 0.632 times the temperature variation ΔTs between the saturation temperature $T_{max}$ and the ambient temperature $T_0$, the saturation temperature $T_{max}$ actually varies dependently on variations in the voltage applied to the coil part and a condition for intermittence energization, and the temperature characteristics during the temperature variation reaching the saturation temperature $T_{max}$ change.

However, in conventional temperature estimation devices, because it is assumed that the heat capacity of the target for temperature estimation is constant, both the way in which the coil current rises and the way in which the coil temperature rises are assumed to be constant. Therefore, the deviation between the estimated value of the coil temperature and the actual coil temperature is large, and motor control devices cannot perform high-accuracy motor control responsive to the coil temperature.

Accordingly, the temperature estimation device 13 estimates the drive duty ratio D' by taking account of the influence of the ambient temperature $T_0$ on the energization to the coil part, on the basis of the drive duty ratio D and the ambient temperature $T_0$, estimates the power consumption P of the motor 2 when the coil part is energized with the drive duty ratio D', the power consumption Pz of the motor 2 accompanied by the heat dissipation of the coil part, the power difference ΔP between both the power consumption values, the temperature time constant τs of the coil part, and the temperature variation ΔT of the coil part during the period of the temperature time constant τs, and estimates the temperature variation $\Delta T_n$ of the coil part from the ambient temperature $T_0$ on the basis of these estimated values and the temperature variation $\Delta T_{n-1}$ of the coil part estimated the last time.

It is possible to take into account the heat generation and the heat dissipation of the coil resistance when the coil part is energized, and feed back the last temperature variation $\Delta T_{n-1}$, by handling the power difference ΔP between the power consumption P and the power consumption Pz, the temperature time constant τs, the temperature variation ΔT, and the last temperature variation $\Delta T_{n-1}$ as variables. As a result, the temperature estimation device 13 can estimate the coil temperature with a higher degree of accuracy than those of conventional temperature estimation devices. In addition, the temperature estimation device 13 can estimate the coil temperature without using a current sensor, unlike the device described in Patent Literature 1.

Next, the operation will be explained.

Figure 4:
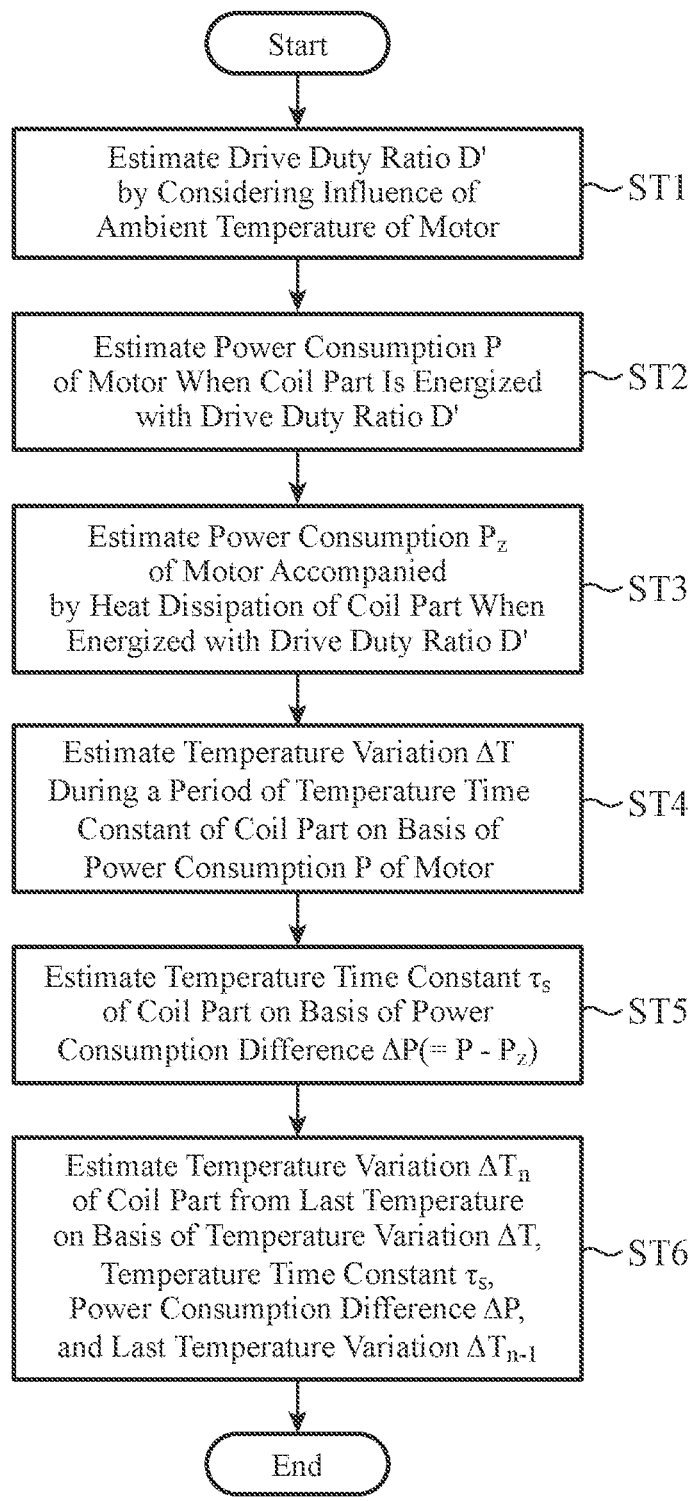
FIG. 4 is a flowchart showing a temperature estimation method according to Embodiment 1.

FIG. 4 is a flowchart showing a temperature estimation method according to Embodiment 1, and shows a series of operations including up to an operation of, in the temperature estimation device 13 shown in FIG. 2, estimating the temperature variation $\Delta T_n$ of the coil part of the motor 2. First, the duty ratio estimation unit 130 receives the command value of the drive duty ratio D and the ambient temperature $T_0$, and estimates the drive duty ratio D' by taking account of the influence of the ambient temperature $T_0$ on the energization to the coil part, on the basis of the drive duty ratio D shown by the command value and the ambient temperature $T_0$ (step ST1).

As factors having an influence on the variations in the coil temperature, there is a current flowing into the coil part, in addition to the coil resistance. The waveform of the voltage applied to the coil part is defined by the drive duty ratio D, and the current flowing into the coil part can be grasped from this voltage waveform. However, the flow of the current in the coil part varies with the ambient temperature $T_0$ of the motor 2.

Therefore, the duty ratio estimation unit 130 estimates the drive duty ratio D' by taking account of the influence of the ambient temperature $T_0$ on the energization to the coil part, in accordance with, for example, the following three relational expressions (3) in which the drive duty ratio D and the ambient temperature $T_0$ are set as variables. In the relational expressions (3), coefficients μ and θ are determined by coefficients κ, ζ, χ, and ψ. The coefficients κ, ζ, χ, and ψ show the relation between the drive duty ratio and the temperature, and are predetermined by conducting experiments simulating various operating environments of the motor 2. Using the following expressions (3) including these coefficients, the drive duty ratio D' is calculated from the ambient temperature $T_0$.

$$D'=\mu T_0+\theta$$

$$\mu=\kappa D+\zeta$$

$$\theta=\chi D+\psi \quad (3)$$

The power consumption estimation unit 131 receives the supply voltage V applied to the motor 2 from the voltage detection circuit 12 which the motor control device 1 includes, receives the drive duty ratio D' from the duty ratio estimation unit 130, and estimates the power consumption P of the motor 2 in which the coil part is energized with the drive duty ratio D', on the basis of the drive duty ratio D' and the supply voltage V (step ST2).

For example, the power consumption estimation unit 131 estimates the power consumption P of the motor 2 in accordance with the following three relational expressions (4) in which the drive duty ratio D' and the supply voltage V are set as variables. In the relational expressions (4), the relational expression about the power consumption P is the one in which the drive duty ratio D' is set as a variable, and, in this expression, the relational expressions about coefficients α and β are the ones in which the supply voltage V is set as a variable. The coefficients α and β are determined by coefficients a, b, c, and d which show the relation between the drive duty ratio and the coil current. The coefficients a, b, c, and d are predetermined by conducting the experiments simulating the various operating environments of the motor 2. Using the following expressions (4) including these coefficients, the power consumption P is calculated from the drive duty ratio D'.

$$P=\alpha D'^2+\beta D'$$

$$\alpha=aV+b$$

$$\beta=cV+d \quad (4)$$

Next, the heat-dissipation electric power estimation unit 132 estimates the power consumption Pz of the motor 2 accompanied by the heat dissipation of the coil part energized with the drive duty ratio D' estimated by the duty ratio estimation unit 130, on the basis of the drive duty ratio D', the supply voltage V applied to the motor 2, and the temperature variation $\Delta T_{n-1}$ of the coil part estimated the last time (step ST3). When the coil part is energized with the drive duty ratio D', the coil part is intermittently energized with current at the time intervals corresponding to the drive duty ratio D'. During a time period during which the coil part is not energized with current, the heat generated in the coil resistance when the coil part is energized with current is emitted, and this is a factor causing the coil temperature to vary.

Therefore, the heat-dissipation electric power estimation unit 132 estimates the power consumption Pz of the motor 2 accompanied by the heat dissipation of the coil part, in accordance with, for example, the following three relational expressions (5) in which the drive duty ratio D', the supply voltage V applied to the motor 2, and the temperature variation $\Delta T_{n-1}$ of the coil part estimated the last time are set as variables. In the relational expressions (5), the relational expression about the power consumption Pz is the one in which the supply voltage V and the last temperature variation $\Delta T_{n-1}$ are set as variables, and, in this expression, the relational expressions about coefficients g and h are the ones in which the drive duty ratio D' is set as a variable.

$$Pz=(gV+h)\times\sigma\Delta T_{n-1}^2$$

$$g=\iota D'+\nu$$

$$H=\upsilon D'+\omega \tag{5}$$

The coefficients g and h are determined by coefficients $\iota$, $\nu$, $\upsilon$, and $\omega$ which show the relation among the drive duty ratio, the coil current, and the temperature. A coefficient $\sigma$ showing the degree of contribution of the last temperature variation $\Delta T_{n-1}$ of the coil part to the power consumption Pz. These coefficients are predetermined by conducting the experiments simulating the various operating environments of the motor 2. Using the above-mentioned expressions (5) including these coefficients, the power consumption Pz is calculated from the drive duty ratio D' and the last temperature variation $\Delta T_{n-1}$ of the coil part.

The temperature variation estimation unit 133 estimates the temperature variation $\Delta T$ during the period of the temperature time constant $\tau s$ of the coil part on the basis of the power consumption P of the motor 2 estimated by the power consumption estimation unit 131 (step ST4). For example, the temperature variation estimation unit 133 estimates the temperature variation $\Delta T$ during the period of the temperature time constant $\tau s$ of the coil part in accordance with the following relational expression (6) in which the power consumption P of the motor 2 is set as a variable. Coefficients $\gamma$ and $\delta$ show the relation between the value which is 0.632 times the largest temperature variation assumed in the coil part (the temperature variation from the ambient temperature to the saturation temperature of the coil part) and the power consumption of the motor 2, and are predetermined by conducting the experiments simulating the various operating environments of the motor 2. Using the following expression (6) including these coefficients, the temperature variation $\Delta T$ is calculated from the power consumption P.

$$\Delta T=\gamma P+\delta \tag{6}$$

The time constant estimation unit 134 estimates the temperature time constant $\tau s$ of the coil part on the basis of the power difference $\Delta P$ (=P−Pz) between the power consumption P estimated by the power consumption estimation unit 131 and the power consumption Pz estimated by the heat-dissipation electric power estimation unit 132 (step ST5). For example, the time constant estimation unit 134 estimates the temperature time constant $\tau s$ of the coil part in accordance with the following relational expression (7) in which the power difference $\Delta P$ is set as a variable. Coefficients $\varepsilon$ and $\xi$ show the relation between the value which is 0.632 times the largest temperature variation assumed in the coil part and the power difference, and are predetermined by conducting the experiments simulating the various operating environments of the motor 2. Using the following expression (7) including these coefficients, the temperature time constant $\tau s$ is calculated from the power difference $\Delta P$.

$$\tau s=\varepsilon\Delta P+\xi \tag{7}$$

The temperature estimation unit 135 estimates the temperature variation $\Delta T_n$ of the coil part from the ambient temperature $T_0$ on the basis of the temperature variation $\Delta T$ during the period of the temperature time constant $\tau s$ of the coil part, the temperature time constant $\tau s$ estimated on the basis of the power difference $\Delta P$, the power difference $\Delta P$, and the temperature variation $\Delta T_{n-1}$ of the coil part estimated the last time (step ST6). For example, the temperature estimation unit 135 estimates the temperature variation $\Delta T_n$ of the coil part from the ambient temperature $T_0$ in accordance with the following relational expression (8) in which the temperature variation $\Delta T$, the temperature time constant $\tau s$, the power difference $\Delta P$, and the last temperature variation $\Delta T_{n-1}$ are set as variables. Further, the coil temperature $T_n(t)$ after a lapse of time t can be determined in accordance with the following relational expression (9). The following expressions (8) and (9) are the ones in which the temperature time constant $\tau s$ calculated using the above-mentioned expression (7) is handled as a nondimensional number, and $\Delta P$ calculated using the above-mentioned expressions (4) and (5) is handled as a nondimensional number. More specifically, the following expressions (8) and (9) qualitatively show how much the value of the temperature time constant $\tau s$ calculated using the above-mentioned expression (7) and the value of $\Delta P$ calculated using the above-mentioned expressions (4) and (5) depend on the temperature variations $\Delta T_n$ and $\Delta T_n(t)$ of the coil part, and are determined by the experiments simulating the various operating environments of the motor 2.

$$\Delta T_n=(\Delta T/\tau s)\times\Delta P+\Delta T_{n-} \tag{8}$$

$$\Delta T_n(t)=(\Delta T/\tau s)\times\Delta P+\Delta T_{n-1}(t) \tag{9}$$

After calculating the temperature variation $\Delta T_n$, the temperature estimation unit 135 calculates the coil temperature $T_n$ in accordance with the following expression (10), and outputs the coil temperature $T_n$ to the determination unit 14 which the motor control device 1 includes.

$$T_n=T_0+\Delta T_n \tag{10}$$

Next, a hardware configuration for implementing the functions of the temperature estimation device 13 will be explained. The functions of the duty ratio estimation unit 130, the power consumption estimation unit 131, the heat-dissipation electric power estimation unit 132, the temperature variation estimation unit 133, the time constant estimation unit 134, and the temperature estimation unit 135, which are included in the temperature estimation device 13, are implemented by a processing circuit. More specifically, the temperature estimation device 13 includes a processing circuit for performing the processes of steps ST1 to ST6 shown in FIG. 4. This processing circuit may be either hardware for exclusive use or a central processing unit (CPU) that executes a program stored in a memory.

Figure 5A:
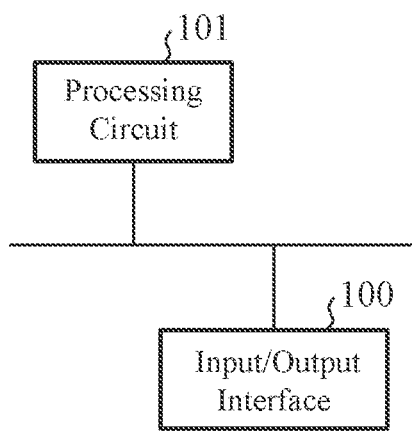
FIG. 5A is a block diagram showing a hardware configuration for implementing the functions of the temperature estimation device according to Embodiment 1.
Figure 5B:
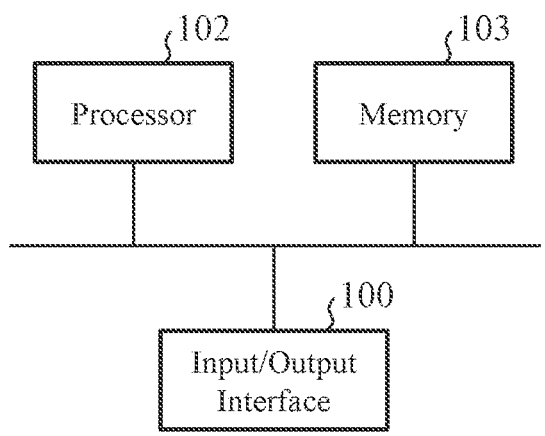
FIG. 5B is a block diagram showing a hardware configuration for executing software to implement the functions of the temperature estimation device according to Embodiment 1.

FIG. 5A is a block diagram showing a hardware configuration for implementing the functions of the temperature estimation device 13. FIG. 5B is a block diagram showing a hardware configuration for executing software that implements the functions of the temperature estimation device 13. In FIGS. 5A and 5B, an input/output interface 100 relays an exchange of data between the temperature estimation device 13 and an external device.

In the case in which the processing circuit is one 101 shown in FIG. 5A which is hardware for exclusive use, the processing circuit 101 is, for example, a single circuit, a composite circuit, a programmable processor, a parallel programmable processor, an application specific integrated circuit (ASIC), a field-programmable gate array (FPGA), or a combination of these circuits. The functions of the duty ratio estimation unit 130, the power consumption estimation unit 131, the heat-dissipation electric power estimation unit 132, the temperature variation estimation unit 133, the time constant estimation unit 134, and the temperature estimation unit 135, which are included in the temperature estimation device 13, may be implemented by different processing circuits, or may be implemented collectively by a single processing circuit.

In the case in which the processing circuit is a processor 102 shown in FIG. 5B, the functions of the duty ratio estimation unit 130, the power consumption estimation unit 131, the heat-dissipation electric power estimation unit 132, the temperature variation estimation unit 133, the time constant estimation unit 134, and the temperature estimation unit 135, which are included in the temperature estimation device 13, are implemented by software, firmware, or a combination of software and firmware. The software or the firmware is described as programs and the programs are stored in a memory 103.

The processor 102 implements the functions of the duty ratio estimation unit 130, the power consumption estimation unit 131, the heat-dissipation electric power estimation unit 132, the temperature variation estimation unit 133, the time constant estimation unit 134, and the temperature estimation unit 135, which are included in the temperature estimation device 13, by reading and executing programs stored in the memory 103. More specifically, the temperature estimation device 13 includes the memory 103 for storing the programs in which the processes of steps ST1 to ST6 shown in FIG. 4 are performed as a result when the programs are executed by the processor 102. These programs cause a computer to execute procedures or methods performed in the duty ratio estimation unit 130, the power consumption estimation unit 131, the heat-dissipation electric power estimation unit 132, the temperature variation estimation unit 133, the time constant estimation unit 134, and the temperature estimation unit 135. The memory 103 may be a computer readable storage medium in which the programs causing the computer to function as the duty ratio estimation unit 130, the power consumption estimation unit 131, the heat-dissipation electric power estimation unit 132, the temperature variation estimation unit 133, the time constant estimation unit 134, and the temperature estimation unit 135 are stored.

The memory 103 is, for example, a non-volatile or volatile semiconductor memory, such as a random access memory (RAM), a read only memory (ROM), a flash memory, an erasable programmable read only memory (EPROM), or an electrically EPROM (EEPROM), a magnetic disc, a flexible disc, an optical disc, a compact disc, a mini disc, a DVD, or the like.

A part of the functions of the duty ratio estimation unit 130, the power consumption estimation unit 131, the heat-dissipation electric power estimation unit 132, the temperature variation estimation unit 133, the time constant estimation unit 134, and the temperature estimation unit 135 may be implemented by hardware for exclusive use, and a part of the functions may be implemented by software or firmware. For example, the functions of the duty ratio estimation unit 130, the power consumption estimation unit 131, and the heat-dissipation electric power estimation unit 132 are implemented by the processing circuit 101 which is hardware for exclusive use, and the functions of the temperature variation estimation unit 133, the time constant estimation unit 134, and the temperature estimation unit 135 are implemented by the processor 102's reading and executing programs stored in the memory 103.

As mentioned above, the processing circuit can implement the above-mentioned functions by using hardware, software, firmware, or a combination of hardware, software, and firmware.

As mentioned above, in the temperature estimation device 13 according to Embodiment 1, the drive duty ratio D' by taking account of the influence of the ambient temperature $T_0$ of the motor 2 on the energization to the coil part is estimated on the basis of the drive duty ratio D and the ambient temperature $T_0$, the power consumption P of the motor 2 when the coil part is energized with the drive duty ratio D', the power consumption Pz of the motor 2 accompanied by the heat dissipation of the coil part, the power difference ΔP between both the power consumption values, the temperature time constant τs of the coil part, and the temperature variation ΔT during the period of the temperature time constant of the coil part are estimated, and the temperature variation $\Delta T_n$ of the coil part from the ambient temperature $T_0$ is estimated on the basis of these estimated values and the last temperature variation $\Delta T_{n-1}$ of the coil part. As a result, the coil temperature of the motor 2 can be estimated without using a current sensor. In addition, the coil temperature can be estimated with a higher degree of accuracy than those of conventional temperature estimation devices.

In the temperature estimation device 13 according to Embodiment 1, the temperature of the cooling water of the engine mounted in a vehicle is used as the ambient temperature. Because a temperature sensor for detecting the temperature of the cooling water is mounted in the vehicle, the temperature estimation device 13 does not have to include a temperature sensor for detecting the ambient temperature $T_0$.

Because the motor control device 1 according to Embodiment 1 includes the drive circuit 10, the voltage detection circuit 12, the temperature estimation device 13, the determination unit 14, and the duty ratio change unit 15, the motor control device can perform high-accuracy motor control responsive to the coil temperature $T_n$ estimated by the temperature estimation device 13.

It is to be understood that the present disclosure is not limited to the above-mentioned embodiment, and a change can be made in any arbitrary component according to the embodiment or an arbitrary component according to the embodiment can be omitted within the scope of the present disclosure.

INDUSTRIAL APPLICABILITY

Because the temperature estimation device according to the present disclosure can estimate the coil temperature of a motor without using a current sensor, the temperature estimation device can be used for, for example, a motor which drives an actuator mounted in a vehicle.

REFERENCE SIGNS LIST

1: motor control device,
2: motor,
3: direct current power supply,
10: drive circuit,
11: bridge circuit,
12: voltage detection circuit,
13: temperature estimation device,
14: determination unit (determiner),
15: duty ratio change unit (duty ratio changer),
100: input/output interface, 101: processing circuit,
102: processor,
103: memory,
130: duty ratio estimation unit,
131: power consumption estimation unit,
132: heat-dissipation electric power estimation unit,
133: temperature variation estimation unit,
134: time constant estimation unit, and
135: temperature estimation unit.

The invention claimed is:

1. A temperature estimation device comprising:
processing circuitry
to estimate a drive duty ratio by taking account of influence of ambient temperature of a motor on energization to a coil part which constitutes the motor, on a basis of both a drive duty ratio corresponding to time intervals of the energization to the coil part and the ambient temperature;
to estimate power consumption of the motor that is in a state where the coil part is being energized with the drive duty ratio, on a basis of a supply voltage applied to the motor and the drive duty ratio;
to estimate power consumption of the motor that is in a state where the coil part is being energized with the drive duty ratio, this power consumption being accompanied by heat dissipation of the coil part, on a basis of the drive duty ratio, the supply voltage applied to the motor, and a temperature variation of the coil part, this temperature variation being estimated last time;
to estimate a temperature variation during a period of a temperature time constant of the coil part on a basis of the power consumption of the motor;
to estimate the temperature time constant of the coil part on a basis of a power difference between the power consumption of the motor and the power consumption; and
to estimate a temperature variation of the coil part from the ambient temperature on a basis of the temperature variation of the coil part, the temperature time constant, the power difference, and the temperature variation of the coil part estimated the last time.

2. The temperature estimation device according to claim 1, wherein temperature of cooling water for an engine mounted in a vehicle is used as the ambient temperature.

3. A motor control device comprising:
a drive circuit to perform pulse width modulation control on energization to a motor in accordance with a drive duty ratio;
a voltage detection circuit to detect a supply voltage applied to the motor;
a temperature estimation device according to claim 2;
a determiner to determine whether or not temperature of the coil part, the temperature being estimated by the temperature estimation device, is normal; and
a duty ratio changer to change a drive duty ratio used for the pulse width modulation control by the drive circuit, on a basis of a result of the determination of the temperature of the coil part, the determination being performed by the determiner.

4. A motor control device comprising:
a drive circuit to perform pulse width modulation control on energization to a motor in accordance with a drive duty ratio;
a voltage detection circuit to detect a supply voltage applied to the motor;
a temperature estimation device according to claim 1;
a determiner to determinate whether or not temperature of the coil part, the temperature being estimated by the temperature estimation device, is normal; and
a duty ratio changer to change a drive duty ratio used for the pulse width modulation control by the drive circuit, on a basis of a result of the determination of the temperature of the coil part, the determination being performed by the determiner.

5. A temperature estimation method comprising:
estimating a drive duty ratio by taking account of influence of ambient temperature of a motor on energization to a coil part which constitutes the motor, on a basis of both a drive duty ratio corresponding to time intervals of the energization to the coil part and the ambient temperature;
estimating power consumption of the motor that is in a state where the coil part is being energized with the drive duty ratio, on a basis of a supply voltage applied to the motor and the drive duty ratio;
estimating power consumption of the motor that is in a state where the coil part is being energized with the drive duty ratio, this power consumption being accompanied by heat dissipation of the coil part, on a basis of the drive duty ratio, the supply voltage applied to the motor, and a temperature variation of the coil part, this temperature variation being estimated last time;
estimating a temperature variation during a period of a temperature time constant of the coil part on a basis of the power consumption of the motor;
estimating the temperature time constant of the coil part on a basis of a power difference between the power consumption of the motor and the power consumption; and
estimating a temperature variation of the coil part from the ambient temperature on a basis of the temperature variation of the coil part, the temperature time constant, the power difference, and the temperature variation of the coil part estimated the last time.

\* \* \* \* \*